United States Patent
Zuckerbaun et al.

(10) Patent No.: US 10,602,680 B2
(45) Date of Patent: Mar. 31, 2020

(54) METHOD OF INTERNAL SEED DISINFECTION BY COMBINING SEED PRIMING WITH VACUUM INFILTRATION

(71) Applicants: Eliezer Zuckerbaun, Ashdod (IL); Simcha Bunim Landau, Ashdod (IL)

(72) Inventors: Eliezer Zuckerbaun, Ashdod (IL); Simcha Bunim Landau, Ashdod (IL)

(73) Assignee: Advent Seed Processing, Ltd., Ashdod (IL)

( * ) Notice: Subject to any disclaimer, the term of this patent is extended or adjusted under 35 U.S.C. 154(b) by 428 days.

(21) Appl. No.: 14/188,030

(22) Filed: Feb. 24, 2014

(65) Prior Publication Data
US 2015/0237806 A1    Aug. 27, 2015

(51) Int. Cl.
| A01C 1/00 | (2006.01) |
| A01C 1/06 | (2006.01) |
| A01G 22/00 | (2018.01) |
| A01C 1/08 | (2006.01) |
| A01G 7/00 | (2006.01) |
| A01H 5/10 | (2018.01) |

(52) U.S. Cl.
CPC ............ A01G 22/00 (2018.02); A01C 1/00 (2013.01); A01C 1/06 (2013.01); A01C 1/08 (2013.01); A01G 7/00 (2013.01); A01H 5/10 (2013.01)

(58) Field of Classification Search
CPC .................................. A01C 1/00; A01C 1/06
USPC ......... 47/56, 57.6, 58.1 R, 58.1 SE, 58.1 FV
See application file for complete search history.

(56) References Cited

U.S. PATENT DOCUMENTS

| 2,932,128 | A |   | 4/1960 | Porter et al. |
| 3,857,678 | A | * | 12/1974 | Klepper ............... A01N 25/00 435/37 |
| 4,208,433 | A | * | 6/1980 | Barham, Jr. ........... A23K 1/004 426/293 |
| 4,624,694 | A | * | 11/1986 | DelliColli ................... 504/189 |
| 4,912,874 | A | * | 4/1990 | Taylor ...................... 47/58.1 R |
| 6,076,301 | A |   | 6/2000 | Eastin |
| 6,313,377 | B1 | * | 11/2001 | Schipper et al. .............. 800/298 |

(Continued)

FOREIGN PATENT DOCUMENTS

| JP | 2005-278528 | * | 10/2005 | |
| WO | WO-0112828 A1 | * | 2/2001 | ......... C12N 15/8205 |

OTHER PUBLICATIONS

Hopkins, D. L., Cucuzza, J.D., and Watterson, J.C. Wet Seed Treatments for the Control of Bacterial Fruit Blotch of Watermelon, 1996. Plant Dis. 80:529-532.

(Continued)

Primary Examiner — David J Parsley (57) ABSTRACT

Embodiments of the disclosed technology are directed to a method for combining seed priming and vacuum infiltration to facilitate deep penetration of chemicals or other substances into seeds. By combining the two processes, the germination process of seeds can be started allowing a relatively lengthy period of disinfection. The lengthy period of disinfection under vacuum provides maximum penetration into the seed in order to eradicate diseases occurring deep inside the seed. Any type of seed priming may be used in the disclosed method, including, but not limited to, osmopriming, matrix priming, or hydropriming. Further, any type of seed may be treated, including most vegetable crops, ornamentals, and agronomic crops.

18 Claims, 4 Drawing Sheets

(56) References Cited

U.S. PATENT DOCUMENTS

| | | | | |
|---|---|---|---|---|
| 6,386,126 B1 * | 5/2002 | Chamberlain et al. | ....... | 111/120 |
| 6,603,061 B1 * | 8/2003 | Armstrong et al. | .......... | 800/294 |
| 6,646,181 B1 * | 11/2003 | Eastin | ........................... | 800/278 |
| 7,189,677 B2 * | 3/2007 | Harada et al. | ................ | 504/100 |

OTHER PUBLICATIONS

Feng et al., Evaluation of Seed Treatments for the Eradication of *Acidovorax avenae* Subsp. *citrulli* from Melon and Watermelon Seeds, 2009, Can. J. Plant Pathol. 31: 180-185.

Kim et al., Effects of Ultrasound, Irradiation, and Acid Electrolyzed Water on Germination of Alfalfa and Broccoli Seeds and *Escherichia colo* O157:H7, 2006, Journal of Food Science—vol. 71. Nr. 6: M168-M173.

Frare, V.C., Tratamento de sementes de melao (*Cucumis melo* L.) para o controle de *Acidovorax avenae* Subsp. *citrulli*, 2010, Tese (Doutorado)—Escola Superior de Agricultura "Luiz de Queiroz", 92 p. il.

\* cited by examiner

Figure 1

Germination Percentage and T50 after Treatment with Oxytetracycline

| Treatment | Germination % | T50 (Hours) |
|---|---|---|
| Untreated | 90 | 84 |
| Matrix priming with 500ppm Oxytetracycline solution | 88 | 92 |
| Vacuum infiltration with 500ppm Oxytetracycline solution followed by Matrix priming with water | 48 | Not Applicable |
| Vacuum infiltration with water followed by Matrix priming with water | 94 | 62 |

Germination Percentage and Presence of Disease
Osmotic Priming with Vacuum Infiltration

| Treatment | Germination % | Disease |
|---|---|---|
| Untreated | 86 | Present |
| Osmotic priming 4 days with 6 hours vacuum infiltration | 98 | Absent |
| Osmotic priming 5 days with 6 hours vacuum infiltration | 96 | Absent |
| Osmotic priming 6 days with 6 hours vacuum infiltration | 91 | Absent |

Germination Percentage, T50, and Presence of Disease Matrix Priming with Vacuum Infiltration

| Treatment | Germination % | T50 (Hours) | Disease Presence |
|---|---|---|---|
| Untreated | 94 | 71 | Present |
| Matrix priming for 3 days with 70 ml water with 24 hours vacuum infiltration | 98 | 45 | Absent |
| Matrix priming for 3 days with 100 ml water with 24 hours vacuum infiltration | 100 | 41 | Absent |
| Matrix priming for 4 days with 100 ml water with 24 hours vacuum infiltration | 99 | 43 | Absent |
| Matrix priming for 5 days with 100 ml water with 24 hours vacuum infiltration | 98 | 45 | Absent |

METHOD OF INTERNAL SEED DISINFECTION BY COMBINING SEED PRIMING WITH VACUUM INFILTRATION

FIELD OF THE DISCLOSED TECHNOLOGY

The disclosed technology relates generally to agriculture, and, more particularly, to a process of treating seeds used in agriculture for sowing.

BACKGROUND OF THE DISCLOSED TECHNOLOGY

Seed borne diseases have a devastating economic effect on world agriculture on a yearly basis. Accurate information on crop losses is difficult to obtain due to the lack of an organized effort worldwide to assimilate such data. However, a publication was located which stated that the total annual world crop losses due to seed borne diseases amounts to the total crops producing in South America in a year (Farm Economy, 1978, Volume 1, Issue 1, Bangladesh Agricultural Economists' Association). A more specific example to show on a small scale the scope of the problem of seed borne diseases can be found in a single crop in a relatively small country like Israel. In the year 2013 due to a seed borne disease in the form of the virus CGMMV in watermelons caused an estimated US$20 Million in crop losses. Furthermore, indirect losses will occur in years to come due to the wide spread contamination of crop land that cannot be used for growing watermelons in a country already severely limited due to the lack of space.

In addition to economic damage in agriculture, seed borne pathogens such as *E. coli* have been implicated in human health diseases (National Institute of Allergy and Infectious Diseases website-accessed Jan. 2, 2014). Seed borne diseases come in a variety of forms including fungi, bacteria, viruses, and viroids. Seed borne diseases affect nearly all agricultural seed crops including vegetables, flowers, cereals, legumes, and field crops. Inoculum of seed borne diseases can be found on the surface of the seed. In addition, inoculum can be found internally in the testa/pericarp, endosperm/cotyledons, and the embryonic axis (Roberts, S J, 2009, Tropical Plant Pathology).

Recently, due to the globalization of the seed industry, seeds are produced in many parts of the world and then sold to a wide range of countries. Therefore, the potential for spreading diseases via seed is great. To date many methods have been developed for disinfecting seeds, but all are far from ideal. Most are only effective for external infections. The few available that are effective for internal infections commonly cause germination problems. Thus, seed borne diseases have become a widespread problem.

The various types of treatments available can be categorized as chemical, physical, and biological. Chemical treatment entails introducing various chemicals including resistance inducers, synthetic, natural, organic, inorganic, systemic, and non-systemic chemicals by various means. Physical treatment includes use of hot water, hot air, steam, dry heat, ultrasound, and radiation. Biological treatments entail the introduction of biological agents that either eradicate the disease or induce natural resistance.

Physical treatments are difficult to use as there is a fine line between effectively eradicating seed borne disease and injuring seeds. Not all batches of seeds react the same to all treatments, and therefore it is difficult to predict how physical treatments will affect seed germination and vigor. Chemical treatments are available that have no phytotoxic effects on seeds, but methods to get complete internal penetration have not been identified.

The use of ultrasound, irradiation, and a soak for up to 60 minutes with acidic electrolyzed water for the eradication of the bacteria *Escherichia coli* O157:H7 on alfalfa and broccoli seeds was examined (Kim, H Y et al, 2006, *Journal of Food Science Vol.* 71, Nr. 6). The study determined that none of these methods were able to deliver satisfactory results. Ultrasound and irradiation are physical treatments, while a 60 minute soak with electrolyzed water is a chemical treatment.

A method of eradicating *Acidovorax avenae* subsp. *citrulli* from melon and watermelon seeds by soaking seeds in various chemicals has been taught (Feng, J. et al, 2009, Canadian Journal of Plant Pathology, volume 31, pages 180-185). The study claims success in eradicating *Acidovorax avenae* subsp. *citrulli* from triploid watermelon seeds using a 30 minute soak with electrolyzed water. However, the design of the study was flawed in that infected seeds used in the study were diploid watermelon seeds, and not triploid seeds. Triploid watermelon seeds used were healthy, and were merely mixed with infected diploid seeds. This only proves that the method is effective on diploid watermelon seeds. In addition, infected seeds were rinsed with a 0.5% sodium hypochlorite solution and therefore assumed to be free from external inoculum. While a 0.5% sodium hypochlorite solution is effective on smooth surfaces such a plastic, on seed it has not been demonstrated to be effective. It was demonstrated that a 1% calcium hypochlorite solution used as a soak for 15 minutes was not effective in eliminating *Acidovorax avenae* subsp. *citrulli* from watermelon seeds (Hopkins, D. L. and Cuccuuza J. D., 1996, Wet Seed Treatments for the Control of Bacterial Fruit Blotch of Watermelon, The American Phytopathological Society, publication no. D-1996-0223-05R). Calcium hypochlorite has greater available chlorine than sodium hypochlorite and is therefore a stronger disinfectant. Therefore, the ability to disinfect seeds internally and the ability to disinfect triploid watermelon seeds remained unproven.

Seed priming is a term used in the seed industry to describe a pre-sowing hydration treatment developed to improve seedling establishment. Seed priming has a long history of use for increasing seed germination in vigor. For example, research is on record as early as 1943 in the field of seed priming (Levitt, J. and Harem, P. C., 1943, A method of increasing the rate of seed germination of *Taraxacum kok-saghyz*. Plant Physiology 18(2): 288-293). Seed priming techniques can be divided in to three main categories which are osmopriming (osmoconditioning), hydropriming (drum priming), and matrix priming (matriconditioning).

The goal with all three mentioned types of priming is to allow a controlled imbibition and induction of the pre-germinative metabolism ("activation"), but radicle emergence is prevented. The hydration treatment is stopped before desiccation tolerance is lost. An important part of the priming process is to stop the process in the right moment, which varies depending on the species and the seed batch. With osmopriming, seeds are incubated in well aerated solutions with a low water potential, and afterwards washed and dried. The low water potential of the solutions can be achieved by adding osmotica like mannitol, polyethyleneglycol (PEG) or salts like KCl. Hydropriming is achieved by continuous or successive addition of a limited amount of water to the seeds. A drum is used for this purpose and the water can also be applied by humid air. On-farm steeping is a simple and useful form of hydropriming that is practiced by incubating seeds for a limited time in water.

Matrix priming is the incubation of seeds in a solid, insoluble matrix (vermiculite, diatomaceous earth, calcined clay, and water-absorbent polymers) with a limited amount of water. This method confers a slow imbibition.

A method of combining matrix priming with chemical or biological treatment was suggested (Eastin, J. A., 2000, U.S. Pat. No. 6,076,301). This method suggests that chemicals or microbes can be mixed with water used for priming, thereby the seeds imbibe the chemical or microbes. This method can be used as a technique both for disinfecting seeds with chemicals, or impregnating seeds with biological agents.

The effectiveness of using an antibiotic solution combined with matrix priming for disinfecting triploid watermelon seeds internally infected with *Acidovorax avenae* subsp. *citrulli* has been tested. In order to screen for effective antibiotics, diploid watermelon seeds were obtained which were externally infected with *Acidovorax avenae* subsp. *citrulli*. Various antibiotics were tested including Kasugamycin, Oxytetracycline, Chloramphenicol, Oxalinic acid, Ciprofloxacin, Ceftriaxone sodium, Trimethoprim-sulfamethoxazole, Colistin sulphate, and Piperacillin/tazobactam. Infected seeds were soaked for 10 minutes in antibiotic solutions of 100 ppm, 250 ppm, and 500 ppm of the above antibiotics. Dosage was chosen based on information reported by Layne Wade (21st Annual Tomato Disease Workshop, Asheville, N.C., November 2006) which stated that the MIC (minimum inhibitory concentration) of Kasugamycin on *Acidovorax avenae* subsp. *citrulli* is greater than 100 ppm. Results were as expected in that 100 ppm was not sufficient to eliminate bacteria on seeds for any of the above antibiotics. Kasugamycin, Oxytetracycline, Chloramphenicol, Oxalinic acid, Trimethoprim-sulfamethoxazole, Colistin sulphate, and Piperacillin/tazobactam were all effective at both 250 ppm, and 500 ppm. Ciprofloxacin and Ceftriaxone sodium were not effective at any dose. One of the effective antibiotics was chosen which was Oxytetracycline at 500 ppm and triploid watermelon seeds were matrix primed with this solution for 6 days. Bacteria in the seeds were not eliminated using this method.

A method of vacuum infiltration of seeds was taught for the purpose of impregnating seeds with beneficial bacteria (Porter, F. E. and McAlpine, V. W., 1960, U.S. Pat. No. 2,932,128). Vacuum infiltration is the process of putting seeds mixed with a liquid medium such as water mixed with chemicals or other substances, in a state of reduced pressure in a vacuum chamber. This method was developed in order to eliminate the need for soaking seeds in a solution containing bacteria or other microorganisms for extended periods of time. Extended soaking can start the germination process in as little as 2 hours, and therefore seeds would have to be planted within 24 hours, and there is no opportunity to dry back the seeds for storage and future use. This method allowed sufficient penetration with only 10 minutes of soaking because of the state of reduced pressure. This method of using vacuum infiltration was used to obtain deep penetration of antibiotics as well as other chemicals for the treatment of melon seeds infected with *Acidovorax avenae* subsp. *citrulli* (Frare, V. C., 2010, Melon (*Cucumis melo* L.) seeds treatment to control *Acidovorax avenae* subsp. *citrulli*, Luiz de Queiroz College of Agriculture). However, no chemical treatment was successful in eradicating the disease from infected seeds using vacuum infiltration.

Upon investigation, it was determined that the problem with the vacuum infiltration not working may have been due to the treatment time of 10 minutes not being long enough. Therefore, testing vacuum infiltration with oxytetracycline at 500 ppm for an extended period of time beyond 10 minutes was carried out. It was expected that by doubling or tripling the 10 minute treatment period, disease would be eradicated from infected seeds. To cover the extreme case, a treatment period 10 times the 10 minute period was done in addition to double and triple. Surprisingly, not even the 100 minute treatment successfully eradicated the seed borne disease.

Following this unsuccessful attempt with vacuum infiltration, it was further surmised that the concentration of antibiotic needed to be increased, and that the treatment length was not the problem. Therefore, a further attempt was made to eradicate seed borne disease using vacuum infiltration with both an extended treatment period, and high concentrations of antibiotic. While previously it was expected that 500 ppm of oxytetracycline would be sufficient, this concentration was doubled, tripled, and for an extreme case to 10 times the original concentration equal to 5000 ppm. Infected seeds were treated with these antibiotic concentrations for 10 minutes, 20 minutes, 30 minutes, and for the extreme case 100 minutes. By accident the 10 minute treatment was forgotten and left for more than 24 hours under vacuum infiltration. Results after laboratory analysis showed that only the treatment for more than 24 hours was effective.

Following the success of the extreme length of vacuum infiltration of 24 hours at a high antibiotic concentration, a low concentration of antibiotics (500 ppm) was then tested for an extreme length of vacuum infiltration of 24 hours. Seed borne disease was eliminated showing that the lengthy treatment with vacuum infiltration and not the high concentration of antibiotics was the key to an effective treatment.

Experiments on other vegetable crops, including broccoli, kohlrabi, watermelon, melon, tomato, pepper, and carrots, have concluded that the minimum time needed under vacuum infiltration in an antibiotic solution to effectively reduce seed borne disease was approximately two hours. However, treating a vast array of agriculture seeds for more than two hours in an aqueous solution commonly causes a decrease in seed quality. This makes the use of a treatment of vacuum infiltration with an aqueous solution for more than two hours not a viable solution for eliminating seed borne diseases in agricultural seeds. Thus, a possible solution to this problem is to combine a method of seed priming together with the lengthy vacuum infiltration in aqueous solutions.

However, to date, these methods have not been combined successfully to achieve superior results.

SUMMARY OF THE DISCLOSED TECHNOLOGY

Therefore, it is an object of the disclosed technology to provide a method which employs a lengthy vacuum infiltration treatment with seed priming, thereby nullifying any problems stemming from the germination process.

Accordingly, a disclosed method combines seed priming and vacuum infiltration together for the purpose of providing a method of deep penetration of seeds with chemicals or other substances in an aqueous solution. By combining the two processes, the germination process of seeds can be started allowing a relatively lengthy period of disinfection. The lengthy period of disinfection under vacuum provides maximum penetration for seed borne diseases occurring deep inside the seed.

In an embodiment of the disclosed technology, a method is used for treating seeds. The method is carried out, not necessarily in the following order, by priming the seeds using a priming technique for a specific priming duration, and applying a vacuum infiltration technique for a specific vacuuming duration to the seeds using a disinfecting solution. The steps may be carried out in any order. The priming technique used may be osmopriming, matrix priming, or hydropriming. The disinfecting solution, may be an antibiotic, such as oxytetracycline. The oxytetracycline may be dissolved in the solution at approximately 250 parts-per-million (ppm). The priming technique may be carried out for duration between one and fifteen days. The vacuuming duration may be anywhere between 2 hours and a 72 hours.

In another embodiment of the disclosed technology, a method is used for treating seeds. The method is carried out, not necessarily in the following order, by: a) choosing a treatment substance to be used in a disinfecting solution; b) performing a phytotoxicity screening of the treatment substance with respect to the seeds; c) priming the seeds using a priming technique for a specific duration; and d) applying a vacuum infiltration technique to the seeds using a disinfecting solution.

The step of phytotoxicity screening may be carried out, in two substeps, by: a) adding chemicals to water; and b) matrix priming the seeds using the water. In embodiments, the treatment substance may be electrolyzed water, an antibiotic, a fungicide, an anti-viral agent, and/or a biological agent. In further embodiments, the seeds may be any type of seeds, including, but not limited to, seeds for vegetable crops, agronomic crops, and/or ornamental crops.

It should be understood that the use of "and/or" is defined inclusively such that the term "a and/or b" should be read to include the sets: "a and b," "a or b," "a," "b." Further details are set forth in the detailed description below.

DETAILED DESCRIPTION OF EMBODIMENTS OF THE DISCLOSED TECHNOLOGY

Embodiments of the disclosed technology are directed to a method for combining seed priming and vacuum infiltration to facilitate deep penetration of chemicals or other substances into seeds. By combining the two processes, the germination process of seeds can be started allowing a relatively lengthy period of disinfection. The lengthy period of disinfection under vacuum provides maximum penetration into the seed in order to exhume diseases occurring deep inside the seed.

Any type of seed priming may be used in the disclosed method, including, but not limited to, osmopriming, matrix priming, or hydropriming. Further, any type of seed may be treated, including most vegetable crops, ornamentals, and agronomic crops. Virtually any substance that is soluble in water, such as fungicides, antibiotics, anti-viral agents, and biological agents can be used to treat seeds with this method providing they are not phytotoxic. In addition, water with biocidal properties such as electrolyzed water can be used as the aqueous solution in the vacuum infiltration process. When using matrix priming or hydropriming, both of which require an aqueous solution, water with biocidal properties such as electrolyzed water or plain water may be used as the aqueous solution. The combination of vacuum infiltration and seed priming can be carried out in any order, either vacuum infiltration first followed by seed priming, seed priming followed by vacuum infiltration, or vacuum infiltration in the middle of the seed priming process.

Duration of the seed priming treatment varies by species. In embodiments of the disclosed technology, the duration of seed priming is decreased to allow time for vacuum infiltration. Total processing time, including seed priming and vacuum infiltration, is adjusted in order to bring seeds as close as possible to completing the germination process but stopping short of germination itself. Following the treatment, the seeds are dried and can be stored for later use. If treated properly, the seeds will be free of seed borne disease, exhibit higher seed vigor, have improved cold temperature germination, and possibly increased germination as well.

Embodiments of the disclosed technology will become clearer in view of the following description of the figures.

Figure 1:
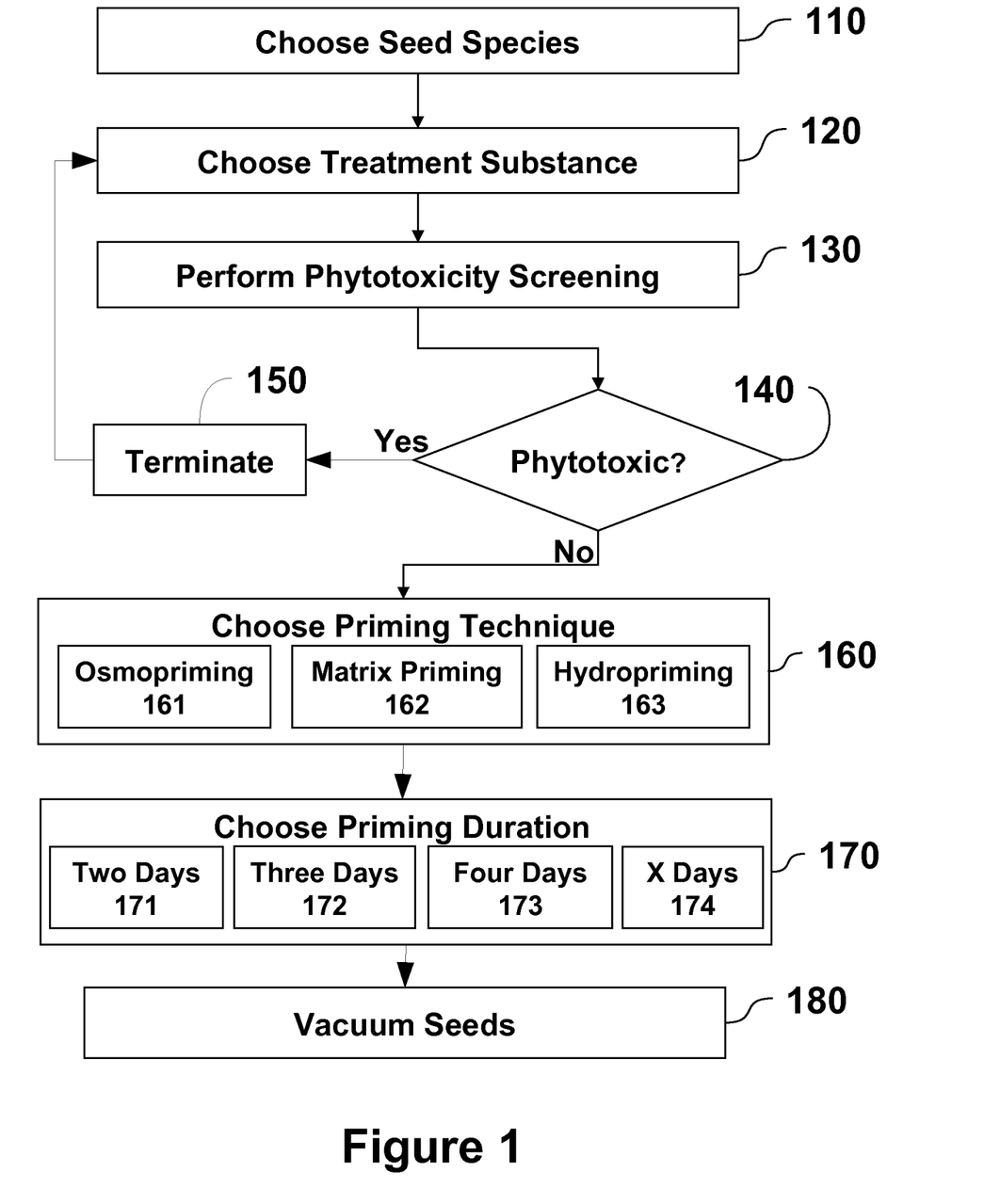
FIG. 1 shows a flow chart outlining steps performed in an exemplary method of carrying out embodiments of the disclosed technology.

FIG. 1 shows a flow chart outlining steps performed in an exemplary method of carrying out embodiments of the disclosed technology. Step 110 involves choosing which species of seed will be sought to be disinfected. The next step, step 120, is directed to selecting appropriate substances that have been demonstrated to be effective against the target disease, and that are not phytotoxic. Since this is a new technique and penetrates deep in to the endosperm of seeds, new phytotoxicty screening needs to be done to see how a substance reacts under this method. Thus, in step 130, a phytotoxicty screening is carried out on the chosen seeds using the chosen treatment. Results of screening using prior methods are not applicable because other methods would have achieved lesser penetration and would not be an appropriate indicator of phytoxicity using the disclosed technology. For example, the inventors screened the antibiotic Oxytetracycline using the method of adding chemicals to the water used in matrix priming (Eastin, J. A., 2000, U.S. Pat. No. 6,076,301) and the method of the present invention. Water containing 500 ppm of Oxytetracycline was used to prime triploid watermelon seeds using matrix priming. Further, the same seed was treated with vacuum infiltration using 500 ppm Oxytetracycline solutions for 6 hours, which was followed by a matrix priming using water. For a control, seed of the same lot was treated using vacuum infiltration with water, followed by matrix priming using water. Also, untreated seeds were preserved as an additional control. The results are shown in the table 200 of FIG. 2.

Figure 2:
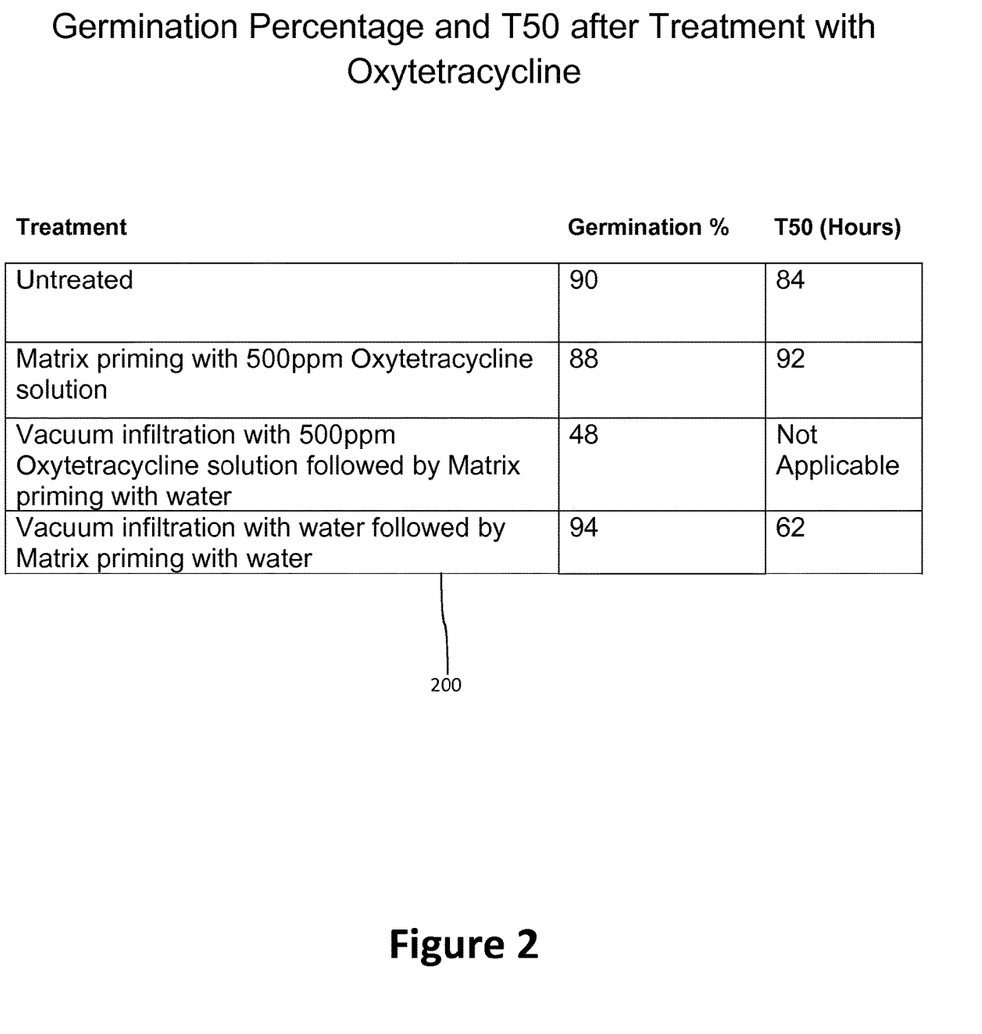
FIG. 2 shows a table of the treatment results of an experiment involving oxytetracycline comparing methods of the prior art with methods of embodiments of the disclosed technology.
Figure 3:
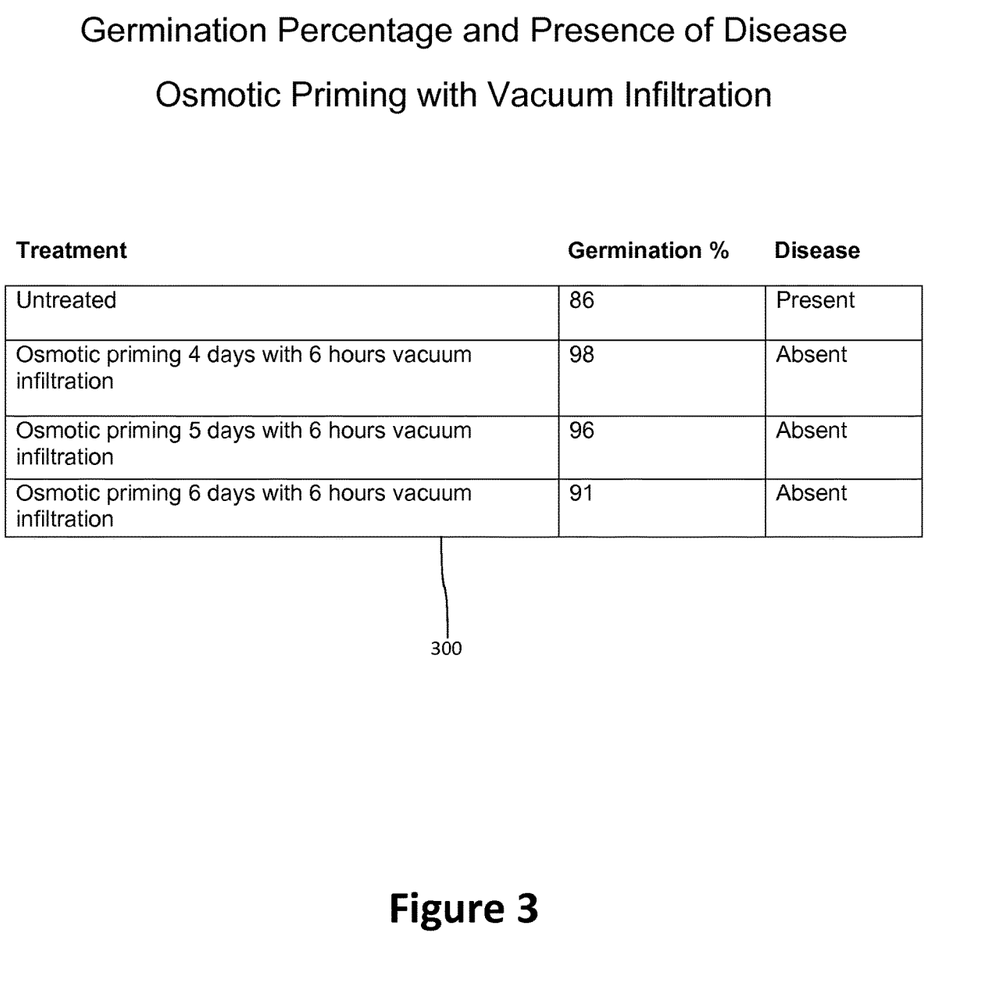
FIG. 3 shows a table of the treatment results of an experiment involving different priming durations used in methods of carrying out embodiments of the disclosed technology.
Figure 4:
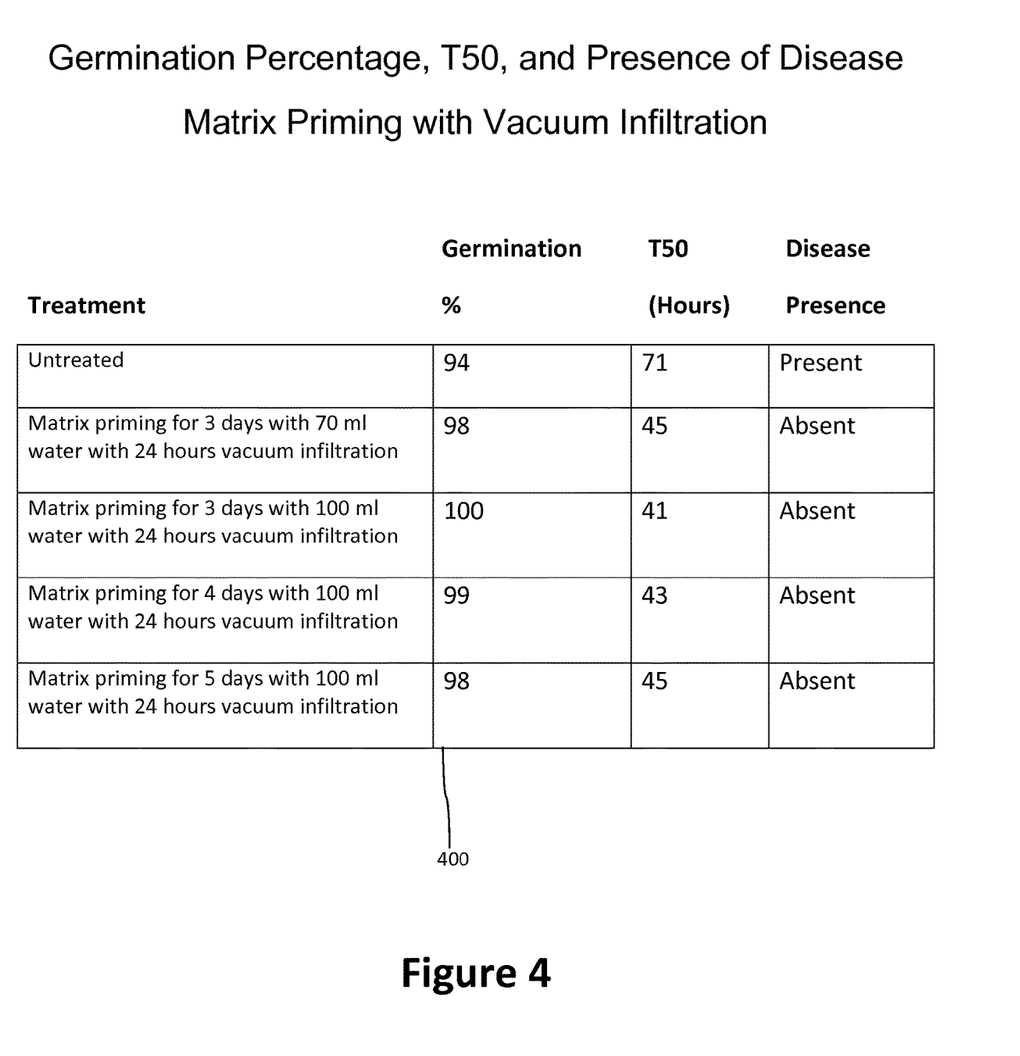
FIG. 4 shows a table of the treatment results of an experiment involving different priming durations and fluid amounts used in methods of carrying out embodiments of the disclosed technology.

The results show that Oxytetracycline is highly phytotoxic when penetrating the seed endosperm. Germination was affected, and T50 (time in hours for 50% of seeds to germinate) was also affected. In addition, seedlings that developed from seeds treated with vacuum infiltration with a 500 ppm Oxytetracycline solution for 6 hours followed by matrix conditioning with water showed severe yellowing while others did not. Results demonstrate both the much deeper seed penetration when using the combination of seed priming and vacuum infiltration with chemicals as opposed to seed priming alone with chemicals, and also the phytotoxicity of Oxytetracycline. In this same manner, any substance can be checked for its suitability to this disinfection technique.

Further screening using the above-described format, showed the following substances to be phytotoxic: Oxalinic acid, ciprofloxacin, chloramphenicol, and trisodium phosphate (a commonly used anti-viral substance). Substances screened showing mild phytotoxic effects include trimethoprim-sulfamethoxazole, colistin sulphate, Terraclor Super X (a commercial fungicide containing pentachloronitrobenzene and etridiazole), and Switch (a commercial fungicide containing fludioxonil and cyprodinil). Substances screened showing no phytotoxic effects are piperacillin/tazobactam, ceftriaxone sodium, and electrolyzed water.

Substances with suitable levels of phytotoxicity are then screened for their affectivity against target diseases. For an example, the inventors screened the antibiotic piperacillin/tazobactam, and electrolyzed water for its affectivity against *Acidovorax avenae* subsp. *citrulli* on diploid watermelons seeds. Diploid watermelon seeds were chosen because they typically exhibit infections externally. Infected seeds were soaked in solutions for 30 minutes of electrolyzed water, and piperacillin/tazobactam at 100 ppm and 250 ppm. Results showed that electrolyzed water and piperacillin/tazobactam at 250 ppm were effective at eliminating the bacteria, while piperacillin/tazobactam at 100 ppm was not effective. This serves only as an example, and any method of screening can be used either in vivo or in vitro to screen for affectivity against target diseases and appropriate dose.

Referring back to FIG. 1, if the screening produces unfavorable results, and the phytotoxicity is found in step 140, then the method is terminated in step 150. After step 150, the method may revert to step 120 whereby a new treatment substance may be chosen.

If no phytotoxicty is found, then in step 160 a priming technique is chosen. Examples of priming techniques include osmopriming 161, matrix priming 162, and hydropriming 163. Proceeding with the method, in step 170, a priming duration is chosen. The priming duration is the length of time to which the seeds are subjected to a priming technique. The duration may range between a one day to a 15 days. The examples shown in FIG. 1 are two days 171, three days 172, and four days 173. Further, X days 174 is depicted to represent any duration prescribed by a user. Finally, in step 180, the seeds are treated using vacuum infiltration. For this step, a duration may be chosen as well, although the duration may not be as dispositive of results compared to the priming duration.

Determination of proper length of priming treatment and vacuum filtration treatment are performed on an empirical basis. For an example, the inventors identified proper treatment length in the following manner. A lot of broccoli seeds infected with *Xanthomonas campestris* pv. *Campestris* were treated with the following treatment regiments. Osmotic priming with Polyethylene glycol (PEG) for 4, 5, and 6 days followed by vacuum infiltration with piperacillin/tazobactam at 500 ppm for 6 hours. Seeds were tested after treatments for both germination and presence of the disease *Xanthomonas campestris* pv. *Campestris*. The results are shown in the table 300 of FIG. 3.

The results show that the best treatment for this particular lot was Osmotic priming for 4 days followed by 6 hours of vacuum infiltration with 500 ppm of piperacillin/tazobactam, which gave the best germination results and eradicated the seed borne disease *Xanthomonas campestris* pv. *Campestris*. This example shows the manner in which treatment protocols may be developed. Several standard protocols can be developed for each specific crop, and each lot is then tested to see which protocol is the best. As a starting point for protocol development, prior knowledge of the art of seed priming is used and then adaptation is made to suit the desired length of the vacuum infiltration process.

As another example based on prior protocol development, melon seeds infected with Cucumber green mottle mosaic virus (CGMMV) were treated. First, the seeds were treated externally with trisodium phosphate to inactivate virus on the seed coast to ensure that infection is internal. Treatments were as follows: Matrix priming for 3 days with 100 grams seed, 300 grams solid matrix, 70 ml water followed by 24 hours vacuum infiltration with electrolyzed water, matrix priming for 3 days with 100 grams seed, 300 grams solid matrix, 100 ml water followed by 24 hours vacuum infiltration with electrolyzed water, matrix priming for 4 days with 100 grams seed, 300 grams solid matrix, 100 ml water followed by 24 hours vacuum infiltration with electrolyzed water, and matrix priming for 5 days with 100 grams seed, 300 grams solid matrix, 100 ml water followed by 24 hours vacuum infiltration with electrolyzed water. During the 24 hour vacuum infiltration period, the electrolyzed water was replaced with fresh electrolyzed water every hour. Seeds were tested for germination and for CGMMV by seedling ELISA. Results are shown in the table 400 of FIG. 4.

According to the results, germination was improved, and time to 50% germination (T50) decreased by 42% showing superior speed in germination in cold temperature. Most importantly, seed borne disease was eradicated. As depicted in FIGS. 2 through 4, combining seed priming with vacuum infiltration before, during, or after priming, internal seed disinfection can be achieved while improving seed germination quality, and enabling storage for future use.

The specific examples above are to be construed as merely illustrative, and not limitative of the disclosure in any way whatsoever. Without further elaboration, it is believed that one skilled in the art can, based on the description herein, utilize the present disclosure to its fullest extent. Although specific examples were given of seed borne diseases, the invention can be used for virtually all seed borne diseases, including bacteria, fungi, viruses, and viroids. In addition, specific crops were mentioned in the examples; however the invention can be used for seeds of virtually any crop including vegetables, agronomic crops, and ornamentals. The invention is an application technique, and can be used with any substance that is miscible in water.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A method of treating ungerminated seeds comprising: priming said seeds using a priming technique for a specific priming duration ranging from 1 to 15 days; and applying a vacuum infiltration technique for 6 hours or more to said seeds using a disinfecting solution, a total processing time, including seed priming and vacuum infiltration, is adjusted in order to bring seeds as close as possible to completing the germination process but stopping short of germination itself.

2. The method of claim 1, wherein said priming technique is osmopriming, matrix priming, or hydropriming.

3. The method of claim 1, wherein said priming technique is matrix priming.

4. The method of claim 1, wherein said priming technique is osmopriming.

5. The method of claim 1, wherein said disinfecting solution is electrolyzed water.

6. The method of claim 1, wherein said vacuuming duration is between 6 hours and 36 hours.

7. The method of claim 1, wherein said vacuuming duration is between 6 and 72 hours.

8. A method of treating ungerminated seeds comprising: choosing a treatment substance to be used in a disinfecting solution; performing a phytotoxicity screening of said treatment substance with respect to said seeds; priming said seeds using a priming technique for a specific duration ranging from 1 to 15 days; and applying a vacuum infiltration technique to said seeds using a disinfecting solution for at least 6 hours, a total processing time, including seed priming and vacuum infiltration, is adjusted in order to bring seeds as close as possible to completing the germination process but stopping short of germination itself.

9. The method of claim 8, wherein said phytotoxicity screening comprises: adding chemicals to water; and matrix priming said seeds using said water.

10. The method of claim 8, wherein said treatment substance is electrolyzed water.

11. The method of claim 8, wherein said treatment substance is an antibiotic.

12. The method of claim 8, wherein said treatment substance is a fungicide.

13. The method of claim 8, wherein said treatment substance is an anti-viral agent.

14. The method of claim 8, wherein said treatment substance is a biological agent.

15. The method of claim 8, wherein said seeds are vegetable crops.

16. The method of claim 8, wherein said seeds are agronomic crops.

17. The method of claim 8, wherein said seeds are ornamental crops.

18. A method of treating ungerminated seeds comprising: applying a vacuum infiltration technique for at least 6 hours to said seeds using a disinfecting solution; followed by priming said seeds using a priming technique for a specific priming duration ranging from 1 to 15 days, a total processing time, including seed priming and vacuum infiltration, is adjusted in order to bring seeds as close as possible to completing the germination process but stopping short of germination itself.

* * * * *